(12) United States Patent
Zapp et al.

(10) Patent No.: US 8,479,703 B2
(45) Date of Patent: Jul. 9, 2013

(54) INTERNAL COMBUSTION ENGINE

(75) Inventors: Bertram Zapp, Ebersberg (DE);
Manfred Maier, Markt Schwaben (DE);
Johannes Hoehl, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/292,478

(22) Filed: Nov. 9, 2011

(65) Prior Publication Data
US 2012/0055441 A1   Mar. 8, 2012

Related U.S. Application Data

(63) Continuation of application No. PCT/EP2010/002189, filed on Apr. 8, 2010.

(30) Foreign Application Priority Data

May 13, 2009   (DE) .......................... 10 2009 021 126

(51) Int. Cl.
*F01M 1/06*   (2006.01)
(52) U.S. Cl.
USPC ....................................... 123/196 R; 184/6.5
(58) Field of Classification Search
USPC ....................................... 123/196 R; 184/6.5
See application file for complete search history.

(56) References Cited

U.S. PATENT DOCUMENTS

| | | | |
|---|---|---|---|
| 2,728,331 A * | 12/1955 | Louzecky et al. | 123/41.38 |
| 3,908,798 A | 9/1975 | Binder | |
| 6,332,443 B1 | 12/2001 | Kaita | |
| 2004/0103872 A1 | 6/2004 | Ronneburger et al. | |
| 2005/0252479 A1 | 11/2005 | Virr | |

FOREIGN PATENT DOCUMENTS

| | | |
|---|---|---|
| DE | 2 257 651 | 5/1974 |
| DE | 101 33 819 A1 | 4/2002 |
| GB | 418517 | 10/1934 |
| JP | 62-151617 A | 7/1987 |
| JP | 7-208480 A | 8/1995 |
| SU | 1449720 A * | 1/1989 |
| WO | WO 01/98638 A1 | 12/2001 |

OTHER PUBLICATIONS

International Search Report dated Sep. 21, 2010 with English translation (six (6) pages).
German Search Report dated Apr. 16, 2010 with partial English translation (nine (9) pages).

* cited by examiner

*Primary Examiner* — Noah Kamen
(74) *Attorney, Agent, or Firm* — Crowell & Moring LLP

(57) ABSTRACT

An internal combustion engine has a crankcase, a crankshaft and at least one crankshaft bearing that can be loaded with lubricant for the purpose of mounting the crankshaft in the crankcase. The at least one crankshaft bearing has at least two separate lubricant feed systems.

12 Claims, 1 Drawing Sheet

INTERNAL COMBUSTION ENGINE

CROSS-REFERENCE TO RELATED APPLICATIONS

This application is a continuation of PCT International Application No. PCT/EP2010/002189, filed Apr. 8, 2010, which claims priority under 35 U.S.C. §119 from German Patent Application No. DE 10 2009 021 126.8, filed May 13, 2009, the entire disclosures of which are herein expressly incorporated by reference.

BACKGROUND AND SUMMARY OF THE INVENTION

The invention relates to an internal combustion engine with a crankcase, a crankshaft and at least one crankshaft bearing that can be loaded with lubricant for the purpose of mounting the crankshaft in the crankcase.

In the internal combustion engines known from the prior art, the crankshaft bearings are loaded with lubricant from only a single lubricant feed system when the internal combustion engine is running.

Owing to this unilateral lubricant loading there are dynamically adverse effects that drastically limit the flow of lubricant to both the opposite bearing area and the connecting rod bearings. Consequently, the amount of lubricant at the crankshaft bearing is wholly inadequate, so that there is an undue rise in temperature. In addition, there is also a sharp drop in the pressure at the crankshaft bearing, so that the lubricant pressure that prevails at the bearing points that are to be supplied thereafter is now even lower. Therefore, the use of very high grade and, thus, expensive bearing materials is often necessary.

Based on this prior art, the object of the invention is to provide an internal combustion engine that can feed a greater quantity of lubricant to the crankshaft bearing when the internal combustion engine is running, that can avoid an undesired sharp drop in the pressure of the lubricant at the crankshaft bearing, and that can, therefore, use more cost-effective bearing materials.

This engineering object is achieved with an internal combustion engine comprising a crankcase, a crankshaft, and at least one crankshaft bearing that can be loaded with lubricant for the purpose of mounting the crankshaft in the crankcase. The at least one crankshaft bearing comprises at least two separate lubricant feed systems.

Preferably, the at least two separate lubricant feed systems are distributed at least approximately uniformly over the circumference of the crankshaft bearing. This strategy makes it possible to achieve a uniform and/or symmetrical lubricating film characteristic when the internal combustion engine is running.

According to a preferred embodiment, in the case of an internal combustion engine, wherein the at least one crankshaft bearing comprises at least two bearing shells, each bearing shell is assigned a lubricant feed system. In this respect it is expedient to arrange the lubricant feed system at least approximately in the center of the bearing shell in the circumferential direction of the crankshaft.

It is regarded as very advantageous if each lubricant feed system is assigned a lubricant channel. This feature ensures an independent and/or sufficient supply of lubricant to the lubricant feed systems.

In an internal combustion engine, wherein the crankcase comprises an upper part and a bottom part, it has proven to be practical if the crankcase upper part has at least one lubricant channel for loading a lubricant feed system of the at least one crankshaft bearing with lubricant and if the crankcase bottom part has at least one lubricant channel for loading a lubricant feed system of the same crankshaft bearing with lubricant.

Other objects, advantages and novel features of the present invention will become apparent from the following detailed description of an especially preferred embodiment when considered in conjunction with the accompanying drawings, where an internal combustion engine housing with a crankshaft and a crankshaft bearing that can be loaded with lubricant are shown as an example.

DETAILED DESCRIPTION OF THE DRAWINGS

Figure 1A:
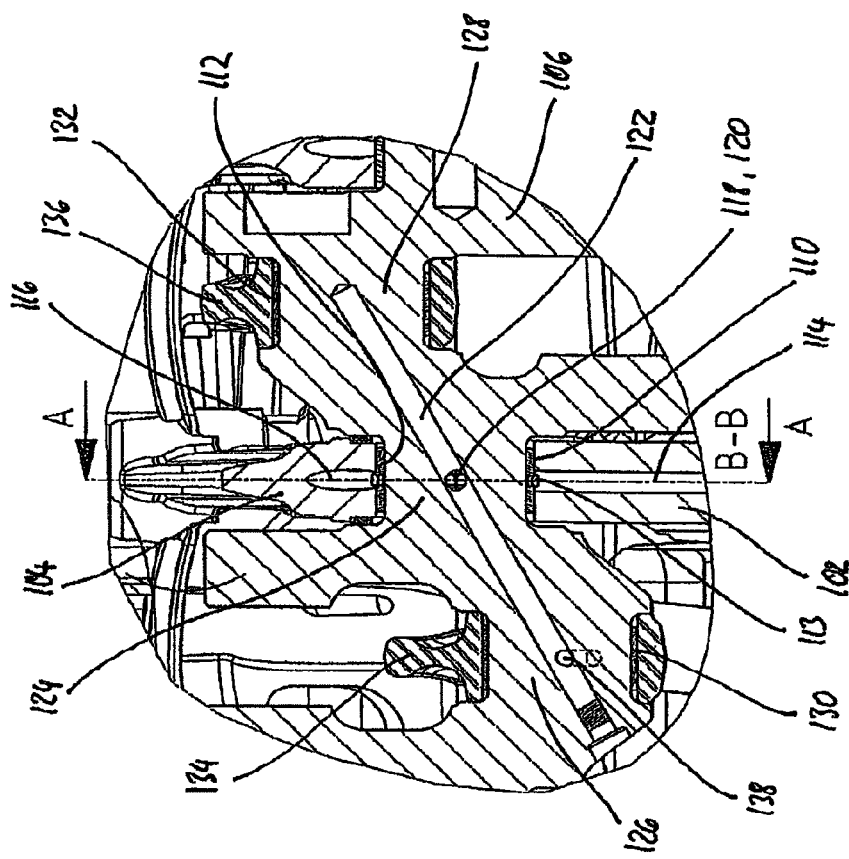
FIG. 1A is a schematic longitudinal view of a detail of an internal combustion engine along the B-B line of the crankshaft.
Figure 1B:
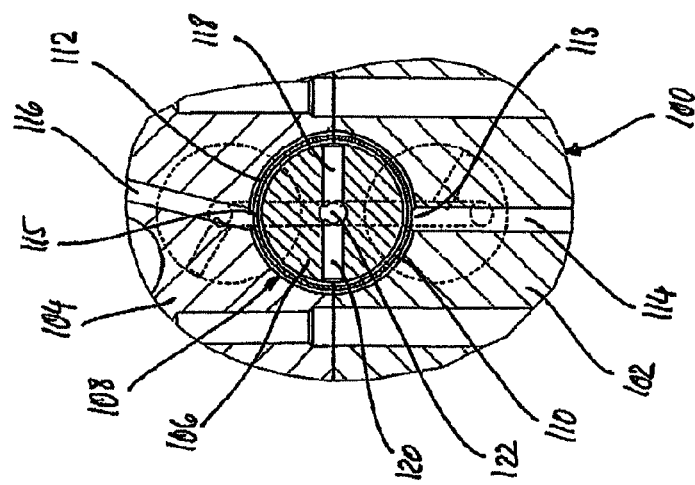
FIG. 1B is a cross-sectional view taken along the line marked A-A in FIG. 1A.

An internal combustion engine, which is not shown in detail, has a crankcase 100. The crankcase 100 is divided horizontally into a bottom part 102 and an upper part 104. In the present embodiment, the parting plane is on a level with the crankshaft axis. A crankshaft 106 is mounted in a rotatable manner in the crankcase 100.

The crankshaft 106 has a shaft journal 124, by which the crankshaft 106 is mounted in the crankcase 100, and crank pins 126, 128, which are axially offset relative to the shaft journal 124 and which serve to mount the connecting rods 134, 136. The detail depicted in the drawing shows a shaft journal 124 and two crank pins 126, 128. However, the internal combustion engine has additional shaft journals, which are mounted in the crankcase 100, and optionally additional crank pins for connecting with the connecting rods. For example, the internal combustion engine may be an in-line four cylinder internal combustion engine, a boxer twin cylinder internal combustion engine or a single cylinder internal combustion engine for use in a motorcycle.

The crankcase 100 has a crankshaft bearing 108 in order to mount the crankshaft 106 on its shaft journal 124. The crankshaft bearing 108 is a sliding bearing. In this case, the crankcase bottom part 102 forms a bearing bottom part, and the crankcase upper part 104 forms a bearing upper part.

The crankcase bottom part 102 and the upper part 104 are screwed together especially in the area of the crankshaft bearing 108. The bearing shells 110, 112 are disposed between the shaft journal 124 and the crankcase 100 in such a way that the bearing shell 110 is assigned to the crankcase bottom part 102, and the bearing shell 112 is assigned to the crankcase upper part 104.

In order to achieve a separation between the bearing surfaces that move relative to each other when the internal combustion engine is running, the crankshaft bearing 108 is pressure lubricated. The lubricant pressure is provided by a lubricant pump; an additive loaded mineral or synthetic oil is used as the lubricant.

Separate lubricant feed systems are provided to supply the lubricant. In this case the crankcase bottom part 102 and the bearing shell 110 are assigned a lubricant feed system 113, and the crankcase upper part 104 and the bearing shell 112 are assigned a lubricant feed system 115. Each bearing shell 110, 112 has a bore for the passage of the lubricant. This lubricant passage bore is arranged in the center of the bearing shell in the circumferential direction of the crankshaft and in the axial direction of the crankshaft. The lubricant feed systems 113, 115 are distributed uniformly over the circumference of the crankshaft bearing 108. That is, the two lubricant feed systems 113, 115 in the present embodiment may be situated 180° opposed to one another.

In order to feed the lubricant to the lubricant feed system 113, the crankcase bottom part 102 has a lubricant channel 114, which extends perpendicular, as evident especially from the cutline A-A. In order to feed the lubricant to the lubricant feed system 115, the crankcase upper part 104 has a lubricant channel 116 that extends obliquely, as especially evident from the cutline A-A.

When the internal combustion engine is running, the crankshaft bearing 108 is lubricated, because the lubricant flows from the lubricant channels 114, 116 to the lubricant feed systems 113, 115 and, in so doing, is pressed between the bearing surfaces that move relative to each other, so that a hydrodynamic lubricating film is produced.

In the area of the crankshaft bearing 108, the crankshaft has lubricant channels 118, 120 that are directed transversely to the shaft journal 124 and that empty into a central lubricant channel 122. When the internal combustion engine is running, the lubricant is conveyed from the crankshaft bearing 108 through the lubricant channels 118, 120 to the lubricant channel 122. The lubricant channel 122 extends, as especially evident from the cutline B-B, in the crankshaft, ascending obliquely from the crank pin 126 through the shaft journal 124 into the crank pin 128. Starting from the lubricant channel 122, the bearings 130, 132 of the connecting rods 134, 136 can be loaded with lubricant; each bearing comprising two bearing shells in the present embodiment. In order to supply the lubricant there are lubricant channels 138 that are directed transversely to the crank pin 126, 128.

Since lubricant is fed to the crankshaft bearing 108 of both bearing shells 110, 112, a continuous supply of lubricant is guaranteed. This feature makes it possible to significantly improve the supply of lubricant to the connecting rod bearings 130, 132, which in turn has a positive effect on the lubricating and cooling efficiency at these bearing points. These measures also offer the option of resorting, if desired, to a more cost-effective bearing material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   a crankcase;
   a crankshaft;
   at least one crankshaft bearing operatively configured for mounting the crankshaft in the crankcase, said crankshaft bearing being loadable with a lubricant;
   at least two separate lubricant feed systems operatively arranged for supplying the lubricant to the crankshaft bearing; and
   at least two lubricant channels corresponding to each of the at least two separate lubricant feed systems, wherein each of the at least two lubricant channels empty into a central lubricant channel of the crankshaft, wherein the crankshaft bearing comprises at least two bearing shells, each bearing shell being assigned a respective one of the two separate lubricant feed systems.

2. The internal combustion engine according to claim 1, wherein the two separate lubricant feed systems are distributed at least approximately uniformly over a circumference of the crankshaft bearing.

3. The internal combustion engine according to claim 2, wherein the crankcase comprises an upper part and a bottom part; and
   wherein:
      the upper part of the crankcase comprises at least one of the lubricant channels for loading a first of the two separate lubricant feed systems with lubricant for the crankshaft bearing; and
      the bottom part of the crankcase comprises at least one of the lubricant channels for loading a second of the two separate lubricant feed systems with lubricant for said one crankshaft bearing.

4. The internal combustion engine according to claim 3, wherein at least one of the lubricant channels extends obliquely with respect to the crankshaft.

5. The internal combustion engine according to claim 4, wherein the at least one of the lubricant channels of the upper part of the crankshaft extends obliquely with respect to the crankshaft.

6. The internal combustion engine according to claim 1, wherein each respective lubricant feed system is arranged at least approximately in a center of the bearing shell in a circumferential direction of the crankshaft.

7. The internal combustion engine according to claim 6, wherein the crankcase comprises an upper part and a bottom part; and
   wherein:
      the upper part of the crankcase comprises at least one of the lubricant channels for loading a first of the two separate lubricant feed systems with lubricant for the crankshaft bearing; and
      the bottom part of the crankcase comprises at least one of the lubricant channels for loading a second of the two separate lubricant feed systems with lubricant for said one crankshaft bearing.

8. The internal combustion engine according to claim 7, wherein at least one of the lubricant channels extends obliquely with respect to the crankshaft.

9. The internal combustion engine according to claim 8, wherein the at least one of the lubricant channels of the upper part of the crankshaft extends obliquely with respect to the crankshaft.

10. The internal combustion engine according to claim 1, wherein the crankcase comprises an upper part and a bottom part; and
    wherein:
       the upper part of the crankcase comprises at least one of the lubricant channels for loading a first of the two separate lubricant feed systems with lubricant for the crankshaft bearing; and
       the bottom part of the crankcase comprises at least one of the lubricant channels for loading a second of the two separate lubricant feed systems with lubricant for said one crankshaft bearing.

11. The internal combustion engine according to claim 1, wherein at least one of the lubricant channels extends obliquely with respect to the crankshaft.

12. The internal combustion engine according to claim 11, wherein the at least one of the lubricant channels of the upper part of the crankshaft extends obliquely with respect to the crankshaft.

* * * * *